United States Patent [19]
Heimerl

[11] 3,771,395
[45] Nov. 13, 1973

[54] LOG SLASHER

[76] Inventor: Calvin H. Heimerl, Box 171, Amasa, Mich.

[22] Filed: June 28, 1968

[21] Appl. No.: 741,087

[52] U.S. Cl............... 83/795, 83/797, 83/820, 144/3 D
[51] Int. Cl............................. B27b 17/02
[58] Field of Search............ 143/32, 46, 47; 144/2, 3, 3 D, 34; 83/795, 797, 820

[56] References Cited
UNITED STATES PATENTS

| | | | |
|---|---|---|---|
| 915,808 | 3/1909 | Tevis | 143/68 |
| 2,759,501 | 8/1956 | Kliever | 143/32 |
| 3,455,352 | 7/1969 | Sanders et al. | 143/46 |
| 3,088,501 | 5/1963 | Good et al. | 143/118 |

*Primary Examiner*—Donald R. Schran
*Attorney*—John W. Michael, Gerrit D. Foster, Bayard H. Michael, Paul R. Puerner, Joseph A. Gemignani, Andrew O. Riteris and Spencer B. Michael

[57] ABSTRACT

A log slasher includes an elongated log receiving bunk and a saw assembly movable longitudinally along the bunk to saw logs supported in the bunk into shortened lengths. The saw is pivotally supported at one end on a traveling trolley for movement with the trolley along the bunk and in a vertical plane toward and away from the bunk. A guide moves with the saw to hold the saw against whip as the saw is moving into, and away from, a cut. A lift crane lifts logs into and out of the bunk and includes clam fingers having opposite angled surfaces adjacent the free ends thereof for engaging logs of different diameter. The trolley drive and that for moving the saw toward and away from the bunk are carried on the trolley and an articulated arm assembly, extendible and contractible in response to trolley movement, supports the power supply conduits in a compact arrangement throughout the range of movement of the trolley and saw.

4 Claims, 5 Drawing Figures

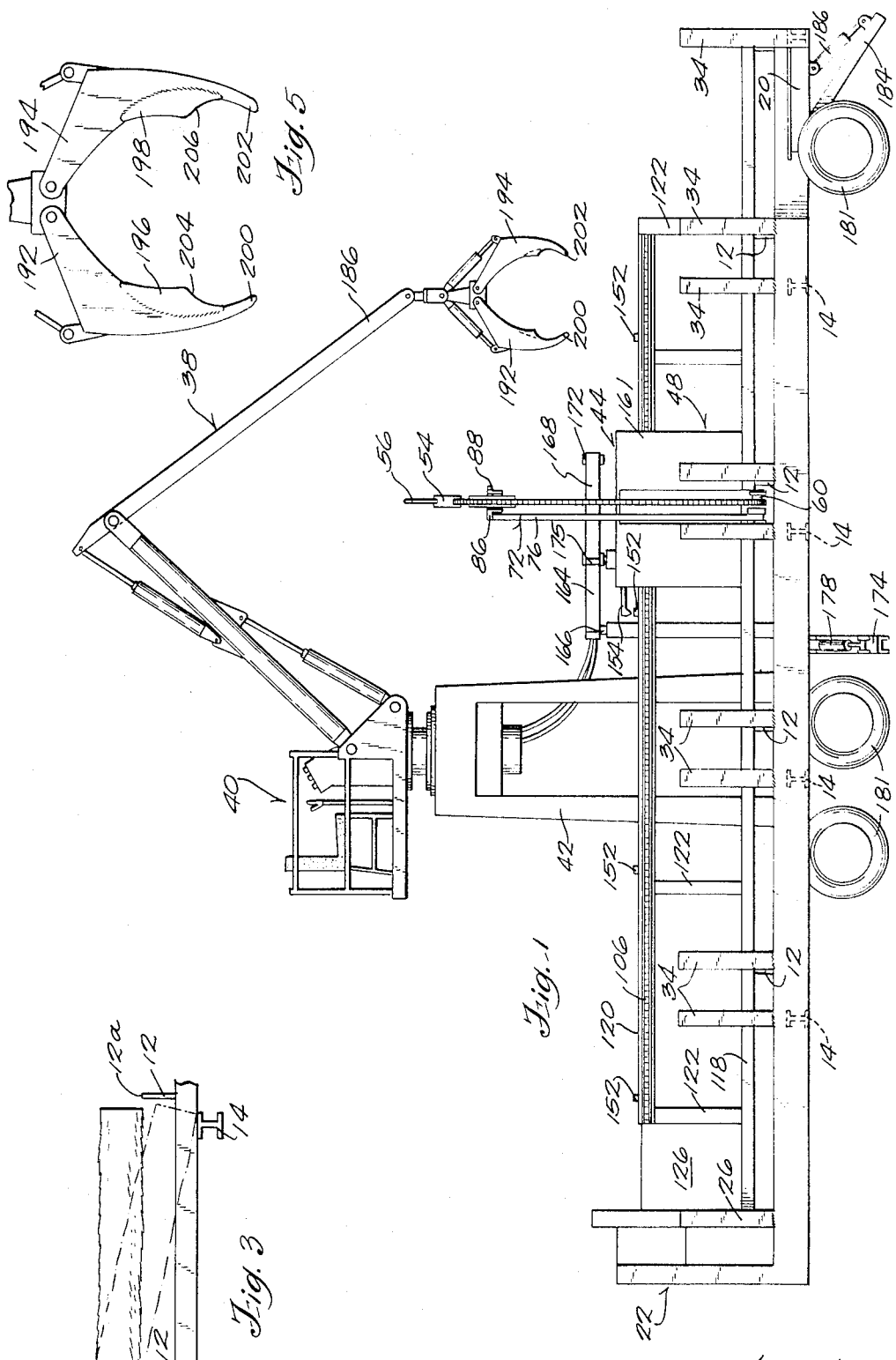

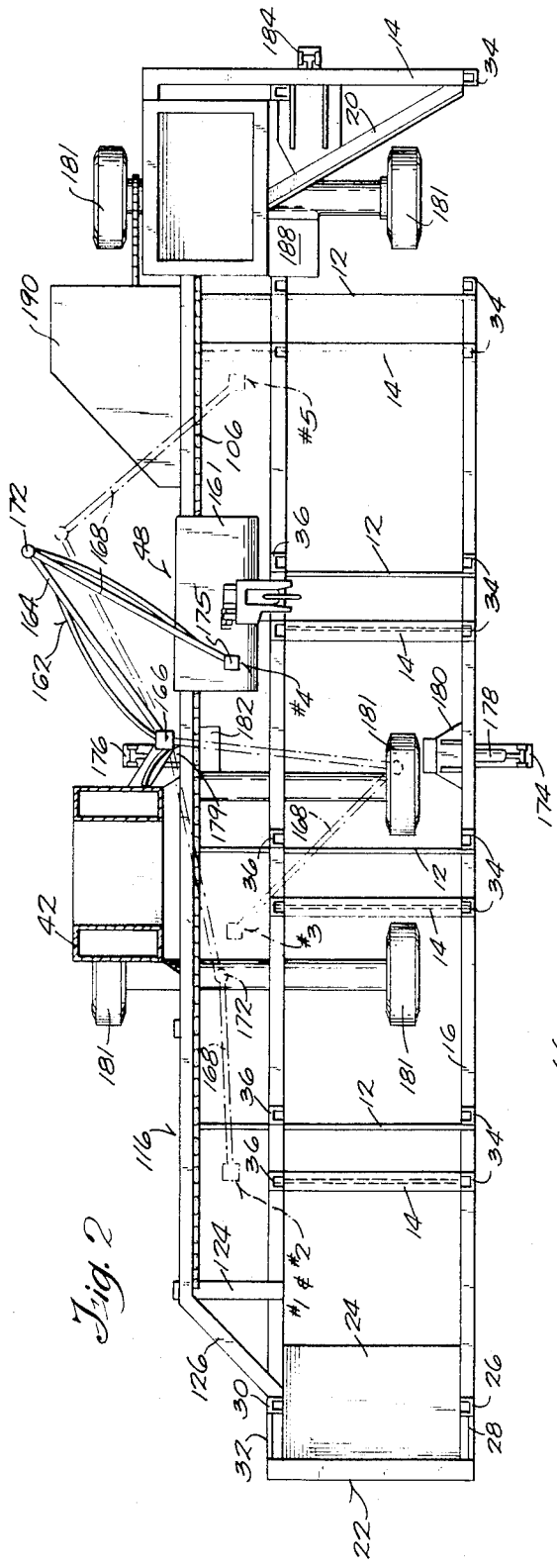

LOG SLASHER

BACKGROUND OF INVENTION

1. Field of Invention

This invention relates to log cutting apparatus and, more particularly, to such apparatus as is referred to in the lumbering industry as a log slasher and used, for example, in pulpwood cutting of stringers into stick length.

2. Description of Prior Art

Log cutting apparatus, or slashers, have been used in pulpwood cutting or generally in rough cutting logs to size. Heretofore, such apparatus have been cumbersome in construction and operation, lacked versatility as to the length of cut timber available and/or lacked general operational versatility. This invention is concerned with these deficiencies in heretofore available log cutting apparatus.

SUMMARY OF INVENTION

Among the general objects of this invention are to provide a compact and versatile cutting apparatus and, further, one which affords facile operation. For the achievement of these and other objects, a log slasher is provided with an elongated log receiving area and a saw assembly which is movable longitudinally along the log receiving area.

The saw may be elongated with one end pivotally connected to a trolley, which trolly is movable along the log receiving area carrying the saw. The opposite or free end of the saw is unsupported but a guide engages the saw at a point spaced outwardly from saw pivot to hold the saw against the whip.

Where a lift crane is provided, the log engaging fingers thereof are provided with angularly diverging surfaces extending inwardly of the fingers in an area adjacent the free end of the fingers. The diverging surfaces accommodate logs of different diameter.

Where the drive for the trolley and the saw are supported on the trolley necessitating lengths of cable to connect the drives to a power source, or power sources, an articulated arm assembly supports the conduits and extends and contracts to accommodate movement while keeping the conduits clear of moving parts.

DESCRIPTION OF DRAWINGS

FIG. 1 is a side elevation of a log slasher embodying this invention;

FIG. 2 is a top plan view of the log slasher;

FIG. 3 is a partial view of the bunk of the log slasher;

FIG. 4 is a perspective of the trolley and saw assembly of the log slasher; and

FIG. 5 is an enlarged view of the log engaging clam members.

DESCRIPTION OF PREFERRED EMBODIMENT

This invention can be embodied in log slashers of the type used in cutting pulpwood wherein stringers (a long trimmed tree) are cut into shorter length sticks (cut sections approximately 100 inches in length). For that reason, the invention will be discussed in that environment as an illustration of a manner of practicing this invention.

A log slasher 10 is illustrated generally in FIG. 1 and includes an elongated stringer receiving pocket having a lower bunk on which the stringers are supported for cutting. The bunk is made up of transverse members 12 and 14 connected to and extending between longitudinal frame members 16 and 18. Members 12 are in the form of vertical plates and four such plates are shown as being spaced longitudinally along the bunk. Four members 14, in the form of I-beams, are offset from the plates and spaced below the upper edges 12a of the plates (see FIG. 3). This arrangement of bunk members is provided to permit ready withdrawal of the saw from the cut sections without binding.

With reference to FIG. 3, a portion of a stringer is shown supported on the bunk and with respect to two adjacent sets of plates 12 and I-beams 14. The righthand hand of the stringer has either been trimmed or has been left from a previous cut. The stringer remains supported on the left plate 12, and other plates to the left of that plate not shown in the drawings, a subsequent cut will made along line X and when the cut is made the righthand of the just severed stick section falls onto I-beam 14 at the right in FIG. 2 producing a V-shaped opening at the cut freeing the saw for withdrawal.

At the righthand end of the slasher, as viewed in FIGS. 1 and 2, transverse member 14 and a reinforcing angle member 20 are positioned below the upper edge of the extreme righthand plate 12 for the same purpose as discussed in preceding paragraph.

Back plate assembly 22 is positioned at the left end of the log slasher. A support plate 24 projects from the back plate 22 into the bunk area generally at the level of edges 12a of plates 12. Vertical assemblies consisting of stake 26, plate 28 and stake 30, plate 32 are disposed at the opposite sides of horizontal plate 24 and the vertical edges of the back plate assembly. Stake assemblies, 34 connected to frame member 16 along one side of the slasher and 36 connected to frame member 18 along the opposite side of the slasher, hold a stringer, or stringers, in the bunk area for cutting.

A loading and unloading clam assembly 38 extends from a control and operator compartment 40 which is in turn supported on a frame 42 connected to the chassis of the log slasher. The clam assembly is manipulated by an operator seated in the compartment 40 and will load a stringer, or a number of stringers as may be accommodated by the height of stake assemblies 34 and 36, into the bunk and subsequently will unload the cut sticks from the log slasher. In loading the stringers into the bunk area the stringers are oriented in the log slasher by abutting one end against back plate assembly 22.

Once positioned in the bunk area, the stringers are cut into the desired stick lengths by saw assembly 44. The saw assembly includes a chain saw 46 which is basically of conventional construction. The chain saw is pivotally supported on a trolley 48. Structurally the chain saw includes a central body portion 50, a continuous saw chain 52 adapted to travel around the body, and a free end shield 54 with a manipulating handle 56. The opposite end of the saw is pivotally connected to the trolley frame by means of bracket 58 and pin 60 (see FIG. 1) supported in bracket 58. The saw assembly is shown in its inoperative position in FIG. 1 and can be moved into cutting engagement with a stringer (FIG. 4) by operating a double acting hydraulic ram 62. One end of ram 62 is connected to frame member 64 of trolley 48 by bracket 66 and operating ram 68 of the hydraulic cylinder is connected to projection 70 connected to and carried on body 50 of the saw assembly. Projection 70 is spaced outwardly from pin 60, on which the saw is pivoted, so that as ram 68 is extended the saw assembly is urged downwardly or in a clockwise direction in FIG. 4.

The use of this type of saw assembly in a log slasher offers a number of advantages. It affords ample reach to saw stringers across the entire width of the bunk with an extremely simple construction and it lends itself well to incorporation in a traveling trolley so that the saw assembly can be moved along the length of the bunk to make the stick cuts. One of the problems encountered with using a saw assembly of this type, namely an elongated mechanism pivotally supported at only one end, is that the saw may experience some amount of whip as it is being started into a particular cut. This problem of saw whip is effectively solved by the use of a saw guide 72 with the saw. Structurally the saw guide includes a bifurcated end plate 74 attached to an elongated arm 76. Arm 76 is supported on pivot pin 82 between brackets 78 and 80 (see FIG. 4), brackets 78 and 80 being supported from trolley platform 84. Relatively spaced arms 86 and 88 of the bifurcated end plate are generally L shaped in transverse cross section and fit over and along both sides of the saw assembly as that assembly is lowered and raised toward and away from engagement with the stringer or stringers.

As the saw is pivoted downwardly by operation of ram 62, saw guide 72 will tend to follow the saw downwardly by virtue of gravity. In order to insure that the saw guide does not interfere with saw operation as the guide follows saw movement, blocks 90 are connected to opposite sides of saw body 50 adjacent end shield 54. The blocks project from both sides of the saw and over the saw chain. These blocks engage legs 86 and 88 and the web between the legs and the legs slide on the blocks as the saw is moved but are held away from the saw chain. The saw guide will engage the stringers as the saw cuts into the stringers and, in that manner, the stringers act as a stop on the saw guide limiting its travel with the saw assembly. The legs 86 and 88 of the saw guide extend beyond the saw assembly so that the saw will have started well into its cut before the saw and guide are disengaged. The guide then holds the saw against any possible whip until the saw has started well into the cut where the stringer itself holds the saw against whip. When the saw is withdrawn from a cut it returns to a position between legs 86 and 88.

Trolley 48, in addition to the frame elements already alluded to in the above discussion, includes frame members 87, 89 and 90. The drive for the saw is supported on platform 84. As illustrated this drive includes hydraulic motor 92 and a gear reducer 94. The gear reducer is suitably connected to the saw chain drive of the saw assembly and is connected to motor 92 by chain 96 and suitable sprockets connected to both the motor and the gear reducer. Motor 92 is connected to a suitable source of hydraulic fluid through coupling and conduit 98, similarly the hydraulic ram for raising and lowering the saw assembly is operated through hydraulic couplings and conduit 100 and 102. A pair of compression springs 104 are connected to the upper side of platform 84 and are aligned with saw guide 72, the springs provide a cushion stop for upward movement of the saw guide.

The trolley is adapted to be moved longitudinally along the log slasher bunk to position the saw assembly along the length of the stringer for cutting the stringers into stick sections. As illustrated, the trolley drive is provided by a combination chain 106 and sprocket 108. Sprocket 108 is mounted on bracket 110 connected to frame member 89. Hydraulic motor 112 is also connected to bracket 110 and provides the power for sprocket 108. Motor 112 is connected to a suitable hydraulic resevoir by coupling and conduit assembly 114. Chain 106 is mounted on an elongated frame assembly 116 comprising vertically spaced, horizontally extending structural members 118 and 120 interconnected by vertical structural members 122. Frame 116 is connected to the bunk portion of the log slasher by horizontal frame elements which are in part separate I-beam members 124 extending between frame members 18 and 118 and extensions of bunk I-beam 14 (see FIG. 2). Angle board 126 extends between vertical member 3o and frame 116 completing the connection of the frame in the log slasher. Chain 106 extends along upper horizontal member 120 and is engaged by sprocket 108 so that when motor 112 is energized to rotate the sprocket the trolley is driven horizontally along frame 116 and relative to the log slasher bunk.

A roller support is provided between the trolley and frame 116 to facilitate longitudinal movement of the trolley. A pair of upper rollers 128 (only one shown is in FIG. 4 as the other is hidden behind frame member 64) are engaged in a track 132 provided by frame member 120. Roller 128 is supported by bearing 130 connected to frame member 90 and a similar bearing support is provided for the other roller at frame member 64. These two rollers carry the entire weight of the trolley and saw assembly. For stability, two pairs of vertically spaced rollers are provided, one roller of each pair being visible in FIG. 4, rollers 140 and 142 supported from frame member 90 by brackets 144 and 146 respectively. The rollers are engaged in tracks 148 and 150 in frame members 120 and 118 respectively. A similar arrangement of rollers is provided at the opposite end of the trolley and are supported from frame member 64. These rollers guide trolley movement along frame 116.

The trolley and saw assembly can be moved longitudinally along the frame 116 and a suitable indexing arrangement can be provided to assist the operator in positioning the saw assembly for the various cuts. For example, a plurality of vertical markers 152, visible in FIG. 1, can be connected along frame member 120 and a pointer 154 connected to the saw assembly, when the free end of the pointer is in alignment with a marker 152 the operator will have properly positioned the saw for a particular cut.

Coil spring 156 is supported between frame member 90 and bracket 110 and is effective to provide a biasing force urging sprocket 108 into engagement with chain 106 to prevent sprocket slippage under heavy loads. One end of the spring is seated against plate 158 connected to plate 110 and the opposite end is carried by an adjustable mechanism 160 to provide a means of varying the biasing force exerted on the sprocket. A shroud 161 is provided and covers the operational elements of the trolley and saw.

With the trolley and saw assembly moving longitudinally along the log slasher bunk, one of the problems is to compactly support the necessary hydraulic fluid conduits in a manner which will accommodate trolley movement while jolding the conduit free of the traveling mechanism. As illustrated, this is accomplished effectively by an articulated arm assembly 162. One arm, 164, is pivotally supported on a post 166 connected to frame 116 and arm 168 is pivotally connected to a post 170 fixed to the trolley. A pivotal connection 172 is provided between the otherwise free ends of arms 164 and 168. FIG. 2 illustrates the movement and various positions of the articulated arm assembly for each position of the saw assembly. In an arrangement where the saw is to cut a stringer into five stick lengths, the full line position in FIG. 2 corresponds to the position for cutting the number 4 stick and also corresponds to the position of the saw in FIG. 1. The trolley is moved to the right of position No. 4 for the number 5 cut with the articulated arm assembly assuming the extended relationship illustrated in FIG. 2 in connection with position No. 5. In the cutting process the fifth stick would be cut first and the trolley would then be moved to position number 4 to cut the fourth stick. After that cut the trolley is moved further to the left to position number 3 during which the arm assembly pivot point 172 moves from one side of frame assembly 116 to the other. From position number 3 the trolley is moved further to the left to the position indicated number 1 and 2 where the first and second sticks are cut. The various hydraulic conduits for powering the trolley drive, the saw assembly drive and the saw lift mechanism, for example, are laced or otherwise suitably connected to the articulated arm assembly. The conduit runs to the frame 42 to a suitable hydraulic resevoir, or resevoirs, and control over the hydraulic operating mechanisms is affected from the operators compartment 40. Conduits, resevoir and the various connections are conventional and therefore are not illustrated in detail.

To stabilize the log slasher during operation a pair of retractable supports 174 and 176 are provided at opposite sides of the log slasher. These supports can be raised and lowered by operation of hydraulic cylinders 178 and 179 connected to supports 180 and 182. A similar type of support 184 can be provided at the forward end of the log slasher, the right as viewed in FIGS. 1 and 2. Support 184 is raised and lowered by hydraulic cylinder 186.

The log slasher is provided with wheels 181 a transmission 188 connected to a power source shown generally at 190, which power source includes controls in addition to those contained in the operator's compartment. This drive and control arrangement provides some limited mobility of the log slasher on a job site. The log slasher can be made completely self propelled or the log slasher could be towed from one job site to another depending on the distances involved. For towing supports 174, 176 and 184 are retracted.

The operator's compartment is positioned on top frame member 42 and conventional clam and articulated arm assembly 38 is connected to the operator's compartment. In a conventional manner the operator controls expansion, raising and lowering and manipulation of clam arms 192 and 194 to grasp and transport a stringer or the cut sticks. The operator's compartment is also capable of rotating about its connection to frame 42 to properly position the clam assembly 38.

A problem encountered in this type of operation is that the stringers, and cut sticks, can vary in diameter which, when taken into consideration with the length of the cut sticks and the extreme length of the stringers which must be manipulated, poses a problem for the operator in picking up and transporting the stringers to and from the log slasher bunk. In accordance with this invention, attachments 196 and 198 are provided on each of the clams arms adjacent the free ends of the arms, 200 and 202 as illustrated in FIG. 5. It will be appreciated that four such arms may be provided with attachment 196 and 198 connected to each of the arms. The attachments project inwardly of the arms as illustrated in FIG. 5 and are provided with sloping faces 204 and 206 which, together with the ends 200 and 202 of the clam arms, define a log grasping area. With reference to one arm (the other being identical) surface 204 and the inner surface of end 200 are disposed at an angle to each other and will securely engage the stringer at two points on opposite slopes of the log regardless of the diameter of that log. In fact, this type of arrangement has been used effectively in securely clamping onto articles varying from 20 inches in diameter down to pencil diameter or, roughly a quarter to ⅜ of an inch. With projections 196 and 198 the operator can securely grasp any article virtually without regard to its diameter or its length and transport it to the bunk. It will be appreciated that the clams arms can be relatively offset so that they and their attachments can overlap to better accommodate articles of extremely small diameter.

Although but one embodiment of the present invention has been illustrated and described, it will be apparent to those skilled in the art that various changes and modifications may be made therein without departing from the spirit of the invention or from the scope of the appended claims.

I claim:

1. Log cutting apparatus comprising, in combination,
means defining a generally elongated log receiving area in said log cutting apparatus,
a saw assembly including an elongated chain saw,
a traveling trolley,
means connecting said chain saw to said trolley for movement therewith and pivotal movement about its connection to said trolley and relative to said log receiving area,
means supporting said trolley for longitudinal movement along said log receiving area,
traversing drive means for moving said trolley along said log receiving area,
said chain saw having a free end spaced from its pivotal connection to said trolley,
guide means including an elongated arm pivotally connected to said trolley and extending from said trolley along and movable with said saw, said guide means further including a bifurcated member connected to said arm spaced outwardly from said pivotal connection thereof to said trolley,
said saw supported for receipt between and substantially wholly within the bifurcations of said member, for movement out of said bifurcations in cutting into said logs, and for return movement into said bifurcations upon withdrawal from a cut so that said saw is held against whip about said pivotal connection as said saw is moved into and out of cutting engagement with logs in said log receiving area,
and projections on opposite sides of said saw engaging said bifurcations and holding said bifurcations in spaced relation from the chain of said saw.

2. The log cutting apparatus of claim 1 wherein said log recieving area includes a horizontal bunk and vertical side members along opposite, longitudinal sides of the bunk for holding logs in said bunk, wherein said means connecting said saw assembly in said apparatus includes means defining elongated track means extending along one side of said bunk, and wherein said saw assembly is engaged on said track means for generally horizontal movement along said bunk and is also movable in a generally vertical plane toward and away from said bunk.

3. Log cutting apparatus comprising, in combination, means defining a generally elongated log receiving area in said log cutting apparatus, a saw assembly, a traveling trolley supporting said saw assembly for movement along said log receiving area, trolley drive means supported on said trolley and operative to move said trolley along said log receiving area, drive means on said trolley connected to said saw assembly for moving said saw assembly into and out of cutting engagement with said logs, elongated conduit means connecting said drive means to a source of power remote from said trolley, and extendible and contractible support means connected to said trolley and an area fixed relative to said log receiving area, said conduit means connected to said extendible and contractible support means and supported thereby during movement of said trolley along said log receiving area.

4. The log slasher of claim 3 wherein said extendible and contractible support means comprises a first arm having a pivotal connection to said trolley, a second arm having a pivotal connection to said fixed area, and means pivotally connecting said first and second arms to each other at a connection spaced on both arms from their said connections to said trolley and said fixed area.

* * * * *